(12) United States Patent
Casagrande (10) Patent No.: US 10,136,171 B2
(45) Date of Patent: Nov. 20, 2018

(54) SYSTEMS AND METHODS FOR AUTOMATICALLY RECORDING CONTENT BASED ON USER WEB ACTIVITY DATA

(71) Applicant: EchoStar Technologies L.L.C., Englewood, CO (US)

(72) Inventor: Steven Michael Casagrande, Castle Pines, CO (US)

(73) Assignee: DISH Technologies L.L.C., Englewood, CO (US)

(*) Notice: Subject to any disclaimer, the term of this patent is extended or adjusted under 35 U.S.C. 154(b) by 3 days.

(21) Appl. No.: 15/156,153

(22) Filed: May 16, 2016

(65) Prior Publication Data

US 2017/0332119 A1    Nov. 16, 2017

(51) Int. Cl.
| | | |
|---|---|---|
| H04N 21/258 | (2011.01) | |
| H04L 29/08 | (2006.01) | |
| H04N 21/466 | (2011.01) | |
| H04N 21/4782 | (2011.01) | |
| H04N 21/433 | (2011.01) | |
| H04N 21/442 | (2011.01) | |
| H04N 21/45 | (2011.01) | |

(52) U.S. Cl.
CPC ....... *H04N 21/25808* (2013.01); *H04L 67/02* (2013.01); *H04L 67/22* (2013.01); *H04L 67/306* (2013.01); *H04N 21/4334* (2013.01); *H04N 21/44222* (2013.01); *H04N 21/4532* (2013.01); *H04N 21/4668* (2013.01); *H04N 21/4782* (2013.01)

(58) Field of Classification Search
CPC .......... H04N 21/4316; H04N 21/2541; H04N 21/23614
See application file for complete search history.

(56) References Cited

U.S. PATENT DOCUMENTS

| | | | | |
|---|---|---|---|---|
| 5,928,330 A | * | 7/1999 | Goetz | H04N 21/23614 348/E5.008 |
| 2006/0277272 A1 | * | 12/2006 | Cantalini | H04N 5/782 709/217 |
| 2008/0010518 A1 | * | 1/2008 | Jiang | H04N 5/782 714/21 |
| 2009/0172733 A1 | * | 7/2009 | Gibbon | H04N 5/44543 725/39 |
| 2009/0217319 A1 | * | 8/2009 | Weiss | G06Q 30/0264 725/34 |

(Continued)

*Primary Examiner* — Joshua D Taylor
(74) *Attorney, Agent, or Firm* — Seed Intellectual Property Law Group LLP (57) ABSTRACT

Systems and methods for automatically recording content based on user web activity data are provided. One such method includes receiving, by a receiving device, user web activity information associated with a user of the receiving device. The receiving device further receives content information associated with program content that will be available for viewing via the receiving device at a future time. The received user web activity information and the content information are compared to determine program content relevant to the user. A timer is automatically set, in advance of a time when the relevant program content will be available for viewing, to record the program content relevant to the user when the program content becomes available for viewing.

20 Claims, 4 Drawing Sheets (56) References Cited

U.S. PATENT DOCUMENTS

| | | | |
|---|---|---|---|
| 2010/0162333 A1* | 6/2010 | Sylvain | H04N 7/17318 |
| | | | 725/109 |
| 2012/0084828 A1* | 4/2012 | Rowe | H04N 21/252 |
| | | | 725/110 |
| 2013/0097626 A1* | 4/2013 | Rajagopal | H04N 21/2541 |
| | | | 725/25 |
| 2014/0115640 A1* | 4/2014 | Walsh | G06F 17/30817 |
| | | | 725/93 |
| 2015/0237391 A1* | 8/2015 | Tsuji | H04N 21/4316 |
| | | | 725/43 |

* cited by examiner

SYSTEMS AND METHODS FOR AUTOMATICALLY RECORDING CONTENT BASED ON USER WEB ACTIVITY DATA

BACKGROUND

Technical Field

The present disclosure generally relates to setting timers for recording program content relevant to a user. More particularly, but not exclusively, the present disclosure relates to systems and methods for automatically recording program content based on user web activity data.

Description of the Related Art

Receiving devices, such as set top boxes, receive content from a content distributor. The received content consists of program and advertising content, as well as content information which may include title, description, length, and other information related to a program. Program content may include, for example, movies, documentaries, television series and audio programs.

Some receiving devices include a recording device, or are networked to a digital video recorder (DVR), such that received program content can be recorded for later viewing. In order to record programming that will be aired at a certain date and time, a user typically sets a timer to record the program at the time of airing. To set a timer, users generally need to navigate a program guide menu (e.g., using a remote controller) in order to identify programming of interest that will be broadcast at some later time. Then, once the user has found a program that the user wishes to record, the user can set a timer through the receiving device such that the receiving device will record that particular program when it is broadcast. The recorded program is thus stored in memory in the receiving device or an external DVR, and is available for the user to view at some later time.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

The present disclosure provides systems and methods for automatically setting or suggesting timers for recording relevant program content based on a user's web activity. A user's web search history is collected by the system either directly from the user's computer or mobile device, or from one or more search engine providers (e.g., Google, Bing, Yahoo, DishAnywhere or the like). Further, the system may collect other user web activity data, such as a user's web browsing history, the user's e-commerce or online purchase history, user social media data (e.g., social media messages, posts, "likes," "tweets," etc.) and the like. A receiving device, such as a set top box, Internet TV application or the like, receives program content (e.g., television programming, movies, on-demand or pay-per-view content, and so on) as well as content metadata that describes the program content (e.g., program guide information, or any other information that describes the program content, such as the program's title, the type of program, actor/actress information, etc.). The receiving device may then compare the user web activity data with the program content metadata to determine programs which might be of interest to the user, as based on the user's web searches, social media activities and so on. One or more timers are then automatically set by the receiving device to record program content that has been determined to be relevant to the user.

As an example, a user may use a search engine to perform a web search for skiing, Peyton Manning and NASCAR. Additionally, the user may have watched a video on YouTube about fixing a leaking toilet. The user's web activity data (e.g., web searches, as well as viewed YouTube videos) is collected by a cable or satellite television set top box (additionally or alternatively, the user's web activity data may be collected by a third party, such as a search engine provider, and provided to the set top box, or processed to determine relevant content, and a signal may be provided to the set top box to set a timer to record the determined relevant content). With this data, the set top box will automatically set recording timers (e.g., within the set top box or timers in a connected digital video recorder (DVR) device) to record program content that is related to the user's search history or other web activities. For example, the set top box could set one or more timers to record program content including skiing events, Denver Broncos football games or interviews with Peyton Manning (or other NFL content), NASCAR or other auto races, and home improvement shows.

Users may have the ability to opt-out of the system, such that the user's web activity information will not be provided to the receiving device, and thus timers will not be automatically set to record program content based on the user's web activity.

In one embodiment, the present disclosure provides a method that includes: receiving, by a receiving device, user web activity information from a user computer device associated with a user of the receiving device; receiving, by the receiving device, content information associated with program content that will be available for viewing via the receiving device at a future time; comparing the received user web activity information and content information to determine program content relevant to the user; automatically setting a timer, in advance of a time when the program content relevant to the user will be available for viewing, to record the program content relevant to the user at the time the program content becomes available for viewing; and recording the program content relevant to the user at the time the program content becomes available for viewing.

In another embodiment, a system for recording program content relevant to a user is provided. The system includes a receiving device having a processor and a computer-readable storage medium, one or more web activity information databases storing web activity information associated with the user, and a content information database storing content information associated with program content that will be available for viewing via the receiving device at a future time. The receiving device is configured to: determine program content relevant to the user based on a comparison of the user web activity information and the content information; and automatically set a timer, in advance of a time when the program content relevant to the user will be available for viewing, to record the program content relevant to the user at the time the program content relevant to the user becomes available for viewing.

In yet another embodiment, the present disclosure provides a computer-readable storage medium storing instructions which, when executed by a processor in a receiving device, cause the processor to: receive user web activity information associated with a user of the receiving device; receive content information associated with program content that will be available for viewing via the receiving device at a future time; compare the received user web activity information and content information to determine program content relevant to the user; and automatically set a timer, in advance of a time when the program content relevant to the user will be available for viewing, to record the program content relevant to the user at the time the program content becomes available for viewing.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

In the following description, certain specific details are set forth in order to provide a thorough understanding of various disclosed embodiments. However, one skilled in the relevant art will recognize that embodiments may be without one or more of these specific details, or with other methods, components, materials, etc. In other instances, well-known structures associated with computer systems including client and server computing systems, as well as networks, have not been shown or described in detail to avoid unnecessarily obscuring descriptions of the embodiments.

Described herein are systems and methods for gathering web search or other web activity information for one or more users associated with a set top box, sending that information to the set top box to determine content relevant to the user, and then automatically setting one or more timers to record the relevant content for later viewing. Additionally or alternatively, the content relevant to the user may be determined by logic residing on one or more servers located remote from the set top box, with the set top box receiving one or more signals instructing the set top box to automatically set one or more timers to record the content for later viewing. For example, the user web search or other web activity information may be collected by a third party (e.g., a search engine provider, video content provider, or any other such entity having access to user web activity information) and the third party may further access the available program content to determine, based on the collected web search or web activity information, program content relevant to the user. The third party may thus instruct the set top box (e.g., a set top box at the user's home or similar premises) to automatically set one or more timers to record the relevant content. User web activity information may be regularly gathered from one or more computer devices (e.g., a personal computer, tablet, smartphone or the like) and therefore generally indicates subjects or topics of interest to the user.

Figure 1:
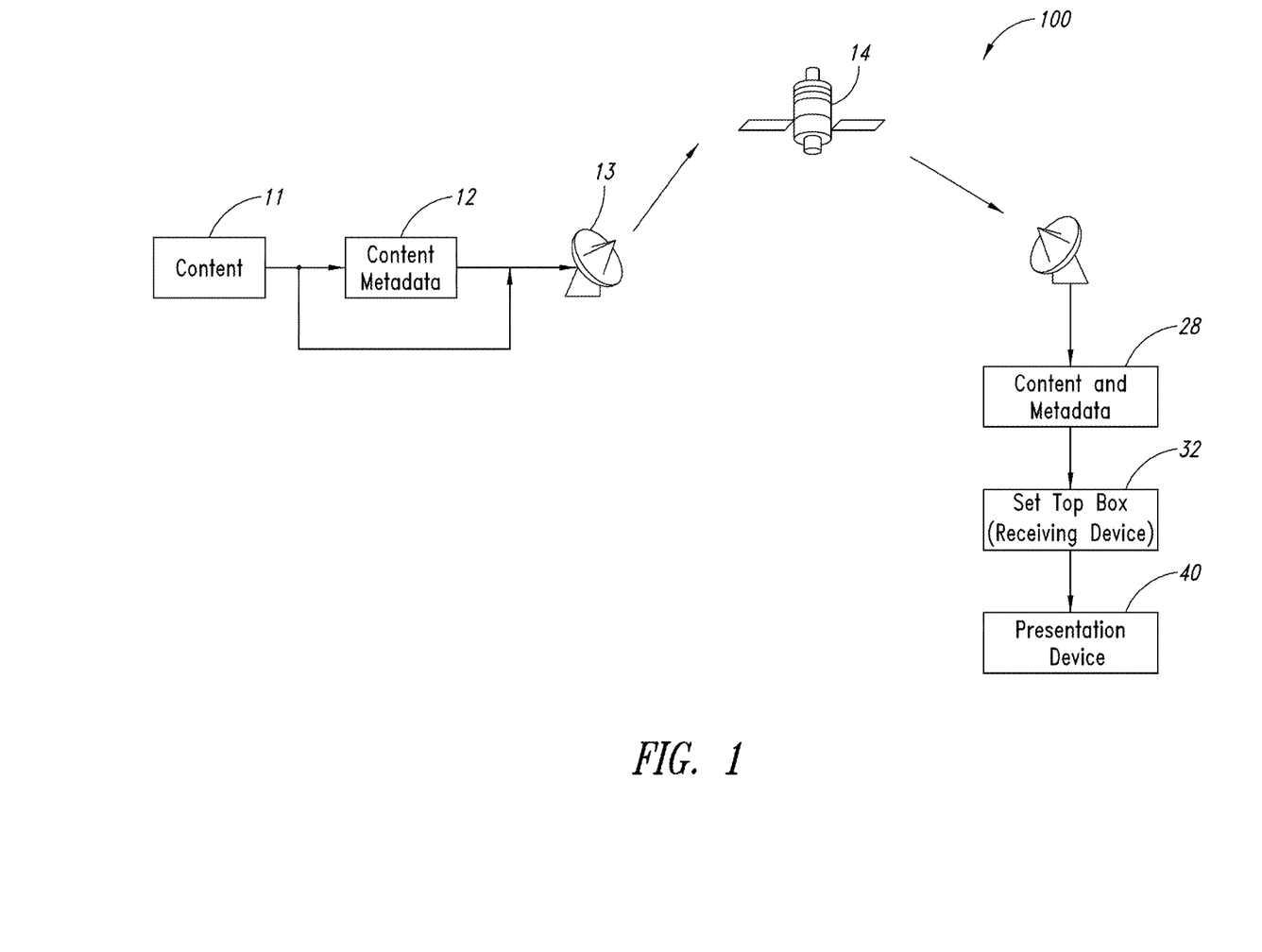
FIG. 1 is an overview diagram of a system in which content is provided from a content generator through a broadcast system to a receiving device, in accordance with one or more embodiments.

FIG. 1 is an overview diagram of a system 100 in which content is provided from a content generator 11 through a broadcast system to a receiving device 32, such as a set top box. For convenience, the receiving device 118 may be interchangeably referred to as a "television converter," "receiver," "set top box," "television receiving device," "television receiver," "television recording device," "satellite set top box," "satellite receiver," "cable set top box," "cable receiver," "media player," and/or "television tuner." Accordingly, the receiving device 32 may be any suitable converter device or electronic equipment that is operable to receive programming. Additionally, the receiving device 32 may be an application, including any combination of software and/or hardware, such as a client application with a video/audio player. For example, the receiving device 32 may be an application in, or accessible by, a smart TV, Internet TV, or the like. Further, the receiving device 32 may itself include user interface devices, such as buttons or switches.

Content 28 consists of program and advertising content, and further includes content metadata, which may be any information associated with the program content, including for example, information contained in program guides. Content metadata 12 can be added to content during content generation or added later through editing prior to broadcast. Content metadata 12 may include, for example, the title of a program, the names of actors and actresses in a program, the type of program (e.g., comedic movie, TV drama, sporting event, etc.), where the program takes place or the location where scenes in a program were shot, or any other information which describes any aspect of the generated content 11.

The content flows to an uplink center 13, to a satellite 14, and to receiver dish 16. The content 28 is then sent to a receiving device 32. The receiving device 32 may be coupled to a presentation device 40, which may be any display device. Examples of a presentation device 40 include, but are not limited to, a television ("TV"), a personal computer ("PC"), a sound system receiver, a digital video recorder ("DVR"), a compact disk ("CD") device, a game system, a mobile device, or the like. Presentation devices 40 include a display, and may further include speakers and/or other output devices to communicate video and/or audio content to a user. In some implementations, one or more presentation devices 40 may be located in or near a customer's premises and may be communicatively coupled, directly or indirectly, to the receiving device 32. Indirect communicative coupling may be accomplished through any wireless communication network or protocol, including, for example, Bluetooth, ZigBee, Z-Wave, Wi-Fi or the like. Further, the receiving device 32 and the presentation device 40 may be integrated into a single device. Such a single device may have the functionality of the receiving device 32 and the presentation device 40, described herein, or may even have additional functionality.

Figure 2:
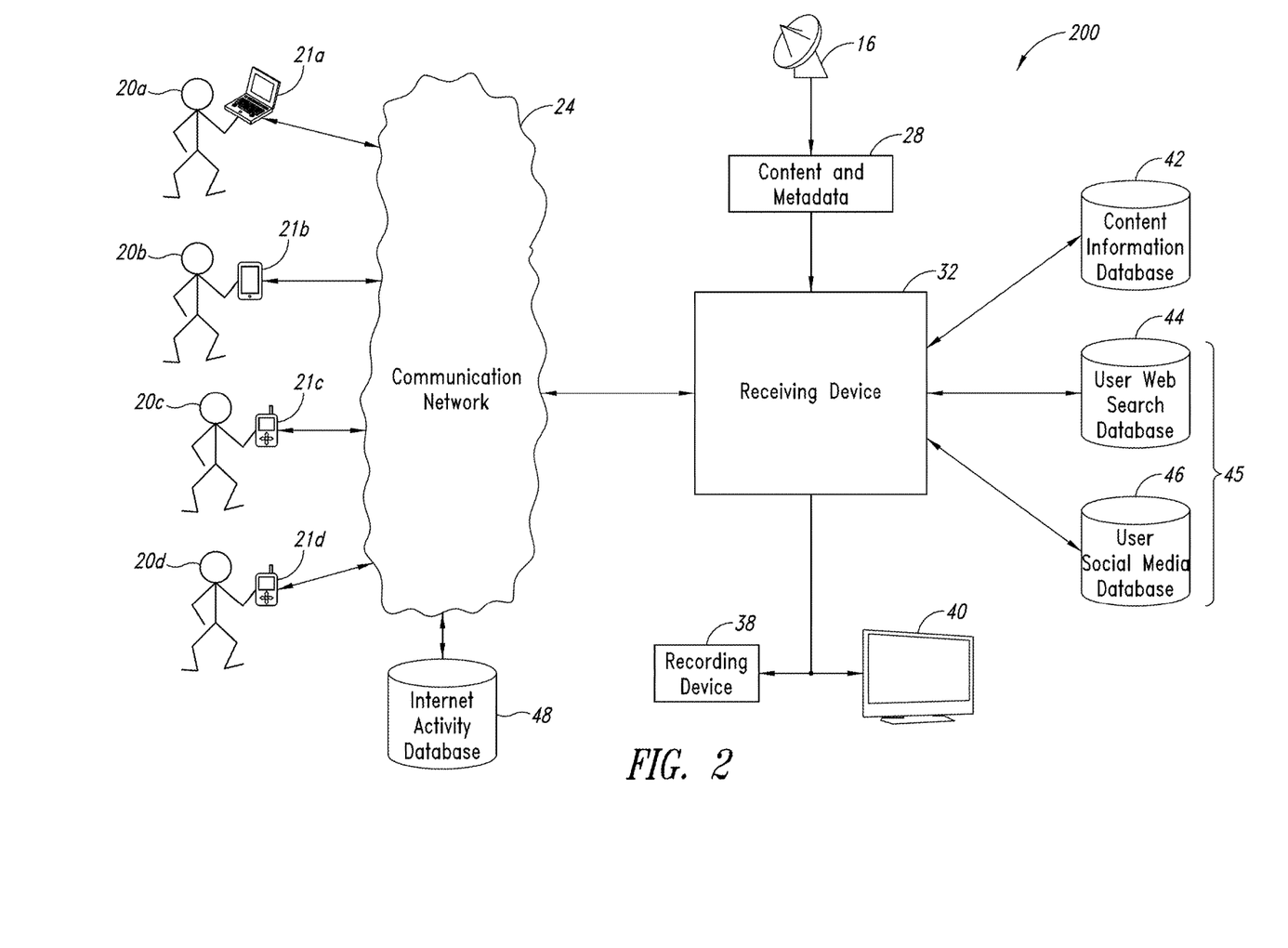
FIG. 2 is an overview block diagram of a system in which user web activity information and content information including content metadata is used to automatically record program content relevant to a user, in accordance with one or more embodiments.

FIG. 2 is an overview block diagram of a system 200 in which user web activity information and content information including content metadata is used to automatically record program content relevant to a user.

One or more users 20a-20d associated with a receiving device 32 may access the Internet using one or more computer devices 21a-21d. The computer devices 21a-21d may be any computer device capable of accessing the Internet, including, for example, a PC, a tablet computer, a smartphone, or the like.

The computer devices 21a-21d and the receiving device 32 may be connected by a communication network 24. The communication network 24 may utilize one or more protocols to communicate via one or more physical networks, including local area networks, wireless networks, dedicated lines, intranets, the Internet, and the like.

User web activity information may be provided to the receiving device 32 via the communication network 24. The user web activity information may include, for example, information relating to web searches performed by a user, web browsing history information, information contained in a user social media profile or account (e.g., Facebook, Twitter, LinkedIn, Pinterest, Google Plus, and the like), a user's social media "likes," posts, "tweets" or messages, video content viewed by the user or web-based video channels the user is subscribed to (e.g., content viewed and/or subscribed to via YouTube, Hulu, Netflix, and the like) and any other web activity information associated with the user which may generally indicate topics or content of interest to the user.

In one embodiment, the receiving device 32 may receive user web activity directly from computer devices 21a-21d. For example, users 20a-20d may "opt in" or otherwise allow access by the receiving device 32 to web activity information stored in an associated computer device 21a-21d.

In another embodiment, user web activity may be collected by web entities (e.g., search engine providers such as Google, Bing, Yahoo or the like, social media platforms such as Facebook, Twitter, LinkedIn or the like, online retail platforms such as Amazon or the like, online video hosting or sharing platforms such as YouTube or the like, and so on), and the collected user web activity may be stored in one or more Internet activity databases 48, which may be managed by the web entities. In such a case, with user authorization, the web entities may provide user web activity information from the Internet activity database 48 to the receiving device 32 via the communication network 24.

User web activity information (e.g., user web activity information received by the receiving device 32 from user computer devices 21a-21d and/or from the Internet activity database 48) may be stored in one or more user web activity databases 45, which may include a variety of databases, including a user web search database 44 and a user social media database 46. User web activity information provided directly from user computer devices 21a-21d may be provided via a real-time connection with the receiving device 32, or the computer devices 21a-21d may store the user web activity information locally until a connection to the receiving device 32 has been established, at which time the stored web activity information is sent to the receiving device 32 and stored in the one or more user web activity databases 45. The user web activity databases 45 may reside on the receiving device 32, or may reside on one or more servers at a remote location.

Each user 20a-20d may have the ability to opt-in or opt-out of having the user's web activity information tracked, recorded and/or provided to the receiving device 32 via the system 200.

Content 28 is received by the receiving device 32 from a receiver dish 16. In other embodiments, a cable system head end may take the place of receiver dish 16. Content 28 includes program content such as movies, documentaries, television programming, and music, as well as advertising content such as commercials, infomercials and the like. Content 28 further includes content information (e.g., content metadata 12) that describes and/or categorizes content, and which may include program type, program description, program title, channel, start time, length, information associated with actors and actresses in a program, geographical information associated with the program such as where the program takes place or the location where scenes in a program were shot, or any other information which describes any aspect of the content 28.

The receiving device 32 extracts content information (e.g., metadata describing the content) and stores the content information in the content information database 42. Information stored in the content information database 42 may include information relating to program content that has not yet been broadcast or otherwise provided for viewing through the receiving device 32. For example, content 28 may include program guide content indicating a future date and time that a particular program will be aired, as well as metadata (e.g., the program's title, the type of program, actor/actress information, etc.) associated with the program. Such content information may be extracted and stored in the content information database 42 prior to airing the program, thus allowing the system 200 to automatically set a timer to record a program of interest to a user (before the program has actually been received by the receiving device 32 for broadcast) based on content information associated with such a program.

The user web search database 44 may include information relating to web searches performed by a user. This information may include, for example, text input to a search engine such as Google, Bing, Yahoo search or the like. For example, a user might input the terms "Denver Broncos tickets" or "ski resorts in Colorado" into a search engine, and that search information may be provided to the user web search database 44. As discussed previously, the user web search information may be stored in the internet activity database 48 (which may be maintained or otherwise controlled by a web entity, such as a search engine provider) and made available to the receiving device 32 or the one or more user web activity databases 45.

The user social media database 46 may contain social media information associated with users of the system 200. Social media information stored in the user social media database 46 may include for example, information associated with a user social media profile or account, social media mentions made by a user relating to television or movie programs of interest, "likes" or similar positive indications associated with a particular program, "tweets" mentioning a particular program of interest and/or similar mentions of programming made by "friends" or other users connected with the user via any social media platform.

Other user web activity information may be stored in the one or more user web activity databases 45, including, for example, any information associated with a user's web browsing history, user account information or other information associated with the user's e-commerce activity via online retail platforms such as Amazon or the like, and information associated with the user's viewing activity on online video hosting or sharing platforms such as YouTube, Hulu, Netflix or the like. The one or more user web activity databases 45, while shown in FIG. 2 as including a user web search database 44 and a user social media database 46, may include additional databases storing other types of user web activity information. Further, the one or more user web activity databases 45 may be combined into a single database, accessible by the receiving device 32, or may be stored as separate databases.

The receiving device 32 may determine program content relevant to a user based on information associated with program content 28 stored in the content information database 42, as well as information associated with the user stored in the user web activity databases 45 (e.g., web search information stored in the user web search database 44, social media information stored in the user social media database 46 or any other information associated with a user's web activities, such as may be stored in the Internet activity database 48). For example, the receiving device 32 may compare information stored in the user web search database 44 (e.g., a user's web search for "Denver Broncos") or the user social media database 46 (e.g., a user's "like," "tweet," "follow" or similar social media positive indication associated with the Denver Broncos) with content information stored in the content information database (e.g., content information indicating that an upcoming Broncos game or Broncos-related program will be aired at a particular date and time) in order to determine program content that is relevant to the user (e.g., Broncos or NFL football related program content).

When the receiving device 32 has determined that a particular program is relevant to a user, the receiving device 32 may automatically set a timer to record the program when the program is aired. That is, the receiving device 32 may automatically set a timer as soon as a date and time that the relevant program will be aired is known. That is, at some time in advance of the actual airing of the relevant program (e.g., days, weeks or even months in advance of the airing of the relevant program), the receiving device 32 may automatically set a timer, and then at the time of airing of the relevant program, the already set timer causes the receiving device 32 to automatically record the relevant program. The receiving device 32 may itself include a recording device (such as, for example, a digital video recorder (DVR)), or may be connected to a recording device 38 and configured to automatically set a timer on such a recording device 38 in order to record relevant programs at the time of airing.

Alternatively, in one or more embodiments, the content relevant to the user may be determined by logic residing on one or more servers located remote from the receiving device 32, with the receiving device 32 receiving one or more signals instructing the receiving device 32 to automatically set one or more timers to record the content for later viewing. For example, the user web activity databases 45, as well as the program content 28 stored in the content information database 42, may be accessed and processed by logic stored the cloud (i.e., by one or more servers located remote from the receiving device 32) in order to determine program content relevant to a user. In such a case, the remote logic may thus instruct the receiving device 32 to automatically set one or more timers to record the relevant content.

The presentation device 40 is coupled to the receiving device 32 and the recording device 38, and thus may be used to display relevant program content 28 recorded by the receiving device 32 or the recording device 38. The receiving device 32 may also present content 28 to users remotely through the communication network 24 to mobile devices having the ability to view video and play audio (e.g., a smartphone, laptop or tablet computer).

Figure 3:
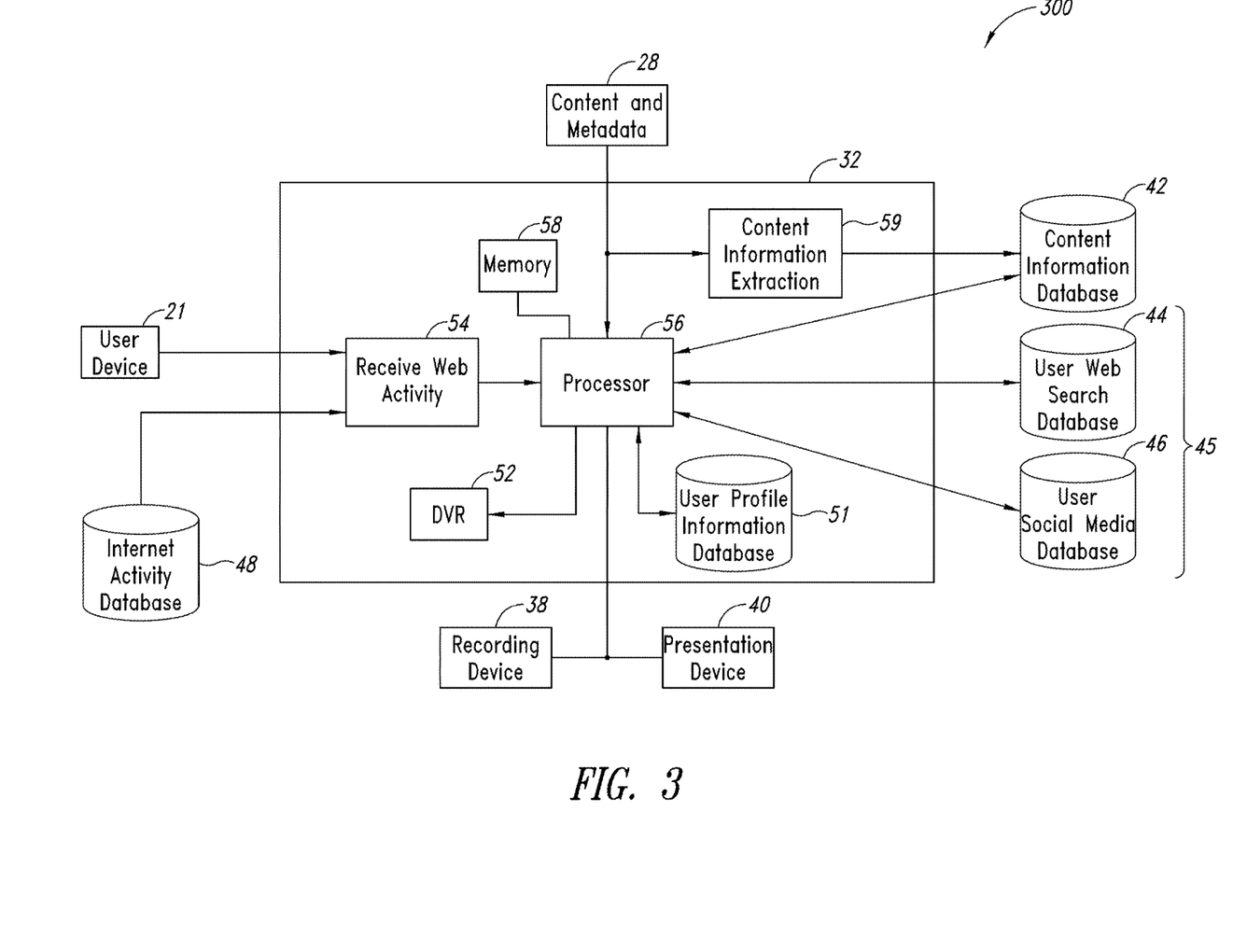
FIG. 3 is block diagram illustrating further details of a receiving device 32, in accordance with one or more embodiments.

FIG. 3 is block diagram illustrating further details of a receiving device 32, in accordance with one or more embodiments. The receiving device 32 includes a processor 56 that includes or otherwise accesses computer-readable memory 58. Memory 114 may be or include any computer-readable storage medium, including, for example, read-only memory (ROM), random access memory (RAM), flash memory, hard disk drive, optical storage device, magnetic storage device, electrically erasable programmable read-only memory (EEPROM), organic storage media, or the like. Memory 58 may store instructions, which when executed by the processor 56, allows the processor 56 to determine content relevant to a user, and to automatically set a timer to record (or to cause an external recording device 38 to set a timer and record) the relevant content.

User web activity information may be received by a receive web activity module 54 in the receiving device 32, and may be received directly from a user computer device 21 or from the Internet activity database 48. The received user web activity information may be processed by the processor 56. For example, the processor 56 may process the received user web activity information to determine a type of web activity information (e.g., user web search information, user social media information or other user web activity information), which particular user (e.g., from among a plurality of users which may be associated with the receiving device 32) the information relates to, to modify or structure the information for storage, or the like. The user web activity information may then be stored in the one or more user web activity databases 45, such as the user web search database 44 and/or the user social media database 46. Additionally or alternatively, user web activity information may be provided from a user computer device 21a-21d directly to the one or more user web activity databases 45, and then accessed by the processor 56 of the receiving device 32.

The user web activity information may be provided to the receiving device 32 directly from a user computer device 21 associated with the receiving device 32 and/or may be provided from the Internet activity database 48. As discussed previously herein, the user web activity may include any information associated with web searches the user performed, social media information related to the user, web browsing history information and any other web-related information which may indicate a user's preference for program content that may be available for recording by the receiving device 32.

The content information database 42, user web search database 44 and user social media database 46 may be stored within the receiving device 32, or may be stored on one or more remote servers accessible (e.g., via a communications network) by the receiving device 32.

The receiving device 32 receives content 28 that includes program content, as well as content information (e.g., metadata) that describes or is otherwise associated with the program content, as described herein. The receiving device 32 includes a content information extraction module 59 that analyzes and extracts content information from the received content 28 and stores the content information in the content information database 42. The receiving device 32 may thus access the content information stored in the content information database 42 for use in determining program content that may be relevant to a user.

As discussed previously herein, the content information may include any information describing or otherwise related to program content available for viewing utilizing the receiving device 32 and/or program content which will become available for viewing at a future date and/or time. Examples of content information may include program type (e.g., sports, drama, game show, comedy, documentary), program description or subject of program (e.g., Broncos, Jeopardy, skiing event, etc.), program title, channel, start time, length, information associated with actors and actresses in a program, location or geographical information associated with the program such as where the program takes place or the location where scenes in a program were shot (e.g., Mile High Stadium, Seattle, Denver, Rocky Mountains), or any other information which describes any aspect of the content 28.

Content 28 includes program content such as movies, documentaries, television programming, and music, as well as advertising content such as commercials, infomercials and the like.

A user profile information database 51 may be included in the receiving device 32 and/or may be stored remotely on one or more servers, and accessible by the receiving device 32. The user profile information database 51 stores information about one or more users associated with the receiving device 32. For example, the receiving device 32 may be a set top box in a family household, and the family may include two parents and a teenage child. Each of the members of the family may have different viewing interests. In such a case, each member of the family may have a separate user profile that is maintained by the receiving device 32, with the user profile information identifying the different members of the family, as well as the computer devices 21a-21d which are associated with each member of the family. The user profile information may include, for example, the user's name, computer device identifier, general user information such as age and gender, user content interests, and relationships to other users associated with the same set top box (e.g., spouse, child, manager, employee, etc.).

The user profile information is used to determine which user the received web activity information relates to, and further may include access restrictions or permission information limiting what content, or how much content, may be automatically recorded for each user. For example, the user profile information database 51 may include access restriction information associated with the teenage child which precludes the receiving device 32 from automatically setting a timer to record adult-oriented program content (e.g., content rated R, TV-MA, or the like), regardless of the relevancy of such content to that teenager as based on the teenager's web activity information.

Further, the amount of content that is recorded at any given time may be limited such that, for example, only a certain number of timers may be set to record program content at the same time. In such a case, the user profile information database 51 may include information specifying or otherwise assigning a number of timers available to each user. For example, the maximum number of timers available for recording content at any given time may be sixteen, and each of the two parents may be assigned six of the sixteen timers, while the teenage child may be assigned four timers for recording content. The information in the user profile information database 51 may be configurable or otherwise edited by one or more users of the receiving device 32 having appropriate access credentials (such as, for example, user ID and password information for log in).

The processor 56 determines program content 28 that may be relevant to a user based on the information stored in the content information database 42 that describes the program content, and further based on information associated with the user stored in the user web activity databases 45 (e.g., user web search database 44 and/or user social media database 46). For example, the information stored in the user web search database 44 and/or the user social media database 46 may generally indicate that a user has a particular interest in NFL football, and more particularly, the Denver Broncos. In such a case, the processor 56 may compare the information in the user web activity databases 45, such as the web search database 44 and the user social media database 46 (either or both of which may contain information indicating that the user is interested in the NFL and the Denver Broncos) with information stored in the content information database 42 (which may include, for example, metadata indicating that an upcoming Broncos game will be aired on a particular date and time), and may determine, based on the comparison, that the user may be interested in the upcoming Broncos game. Additionally, the processor 56 may access the user profile information database 51 to determine which user, among a household of users, might be interested in a particular upcoming program, such as a Broncos football game.

The processor 56 may thus automatically set a timer to record the Broncos game at the time of broadcast for a user associated with the receiving device 32. A recording device such as a digital video recorder (DVR) 52 may be included within the receiving device 32 (which may be, for example, a set top box). In such a case, the processor 32 may automatically cause a timer in the DVR 52 to be set for the particular channel and the particular date and time that the Broncos game will be aired. Alternatively, the receiving device 32 may be coupled to an external recording device 38, and the processor 56 may thus automatically set a timer in (or otherwise cause a timer to be set by) the recording device 38 for recording the game at the time of broadcast.

Additionally, or as an alternative to automatically setting a timer to record content, the receiving device 32 may provide a notification to a user suggesting that a timer be set to record relevant program content 28 that will be broadcast at a future date/time. For example, the receiving device 32 may send a message to a user via email, text message or the like indicating that one or more programs that will soon be aired appear to be relevant to the user, and suggesting that a timer be set to record such relevant programs (e.g., via DVR 52 or external recording device 38). The message may be sent to a computer device 21 associated with the user, an email account associated with the user (e.g., as may be known from information stored in the user profile information database 51) or the like. As an example, the receiving device 32 may provide a message such as, "The Denver Broncos vs. Kansas City Chiefs game airs tomorrow at 3 pm; would you like to record the game?" The user may thus be prompted to indicate by response whether a timer should be set to record the program content.

Additionally, or alternatively, the receiving device 32 may transmit a message to the user computer device 21 indicating that a timer has already been automatically set to record the relevant program content. The user may thus be prompted to confirm (e.g., via an electronic message provided to the receiving device 32) or otherwise to instruct the receiving device 32 to record the relevant program content when the program content becomes available for viewing.

Recorded content may later be viewed by users utilizing a local presentation device 40 directly connected to the receiving device 32, such as a television, or on remote devices connected to the receiving device 32 over the Internet, such as user computer devices 21a-21d.

Users 20a-20d may manually set timers to record content, for example, by browsing programs in a program guide and selecting one or more programs to record. The receiving device 32 may distinguish between such manually set recording timers and timers automatically set by the receiving device 32. For example, manually set timers may have a higher priority than automatically set timers. In such a case, if the users 20a-20d collectively set all of the available timers at a particular time (e.g., with sixteen recording timers being available at any given time), then the receiving device 32 will not automatically set any timers to record relevant content at that time.

The timers for recording content may be prioritized based on user-provided priority information. For example, the receiving device 32 may be a set top box used by a family household. In such a case, the timers may be prioritized such that one or more members of the household (e.g., parents) may be assigned or allotted a particular number of timers, and their timers will have a higher priority than the timers assigned to one or more other members of the household (e.g., children).

Recorded content and timers set for recording may be presented to the user, for example, in a menu provided by the receiving device 32. The receiving device 32 may display the timers automatically set for recording in a different location (e.g., a different menu location) than the manually set timers. Thus, users may navigate to a menu (e.g., using a remote control coupled to the receiving device 32 or the presentation device 40) provided by the receiving device 32 and which displays all of the users' manually set timers or all of the program content already recorded based on manually set timers. Additionally, users may navigate to a separate menu which lists or otherwise displays all of the automatically set timers or all of the content already recorded based on automatically set timers.

Since a relatively high volume of program content may be determined as being relevant to one or more users associated with a particular receiving device 32, a relatively high volume of program content may be recorded via the automatically set timers. Accordingly, in one or more embodiments, the automatically recorded content (as opposed to content recorded based on manually set timers) may be automatically deleted after some predetermined period of time, e.g., a week or a month. The period of time that automatically recorded program will be stored, before deletion, may be set by the users. Further, users may limit the number of timers available at any given time for automatically recording program content, and may further limit the amount of content that that can be automatically recorded over any period of time (e.g., no more than two hours per day).

In one or more embodiments, the receiving device 32 may determine that certain pay-per-view content or premium programming content (e.g., HBO, Showtime or the like) may be relevant to one or more users 20a-20d. However, the users 20a-20d may not be subscribers to the pay-per-view or premium content. In such a case, the receiving device 32 may provide a message (e.g., a message displayed on the presentation device 40 or an electronic message sent to the user computer devices 21a-21d) suggesting that the users may be interested in the program content and may wish to subscribe in order to receive or automatically record the program content.

Figure 4:
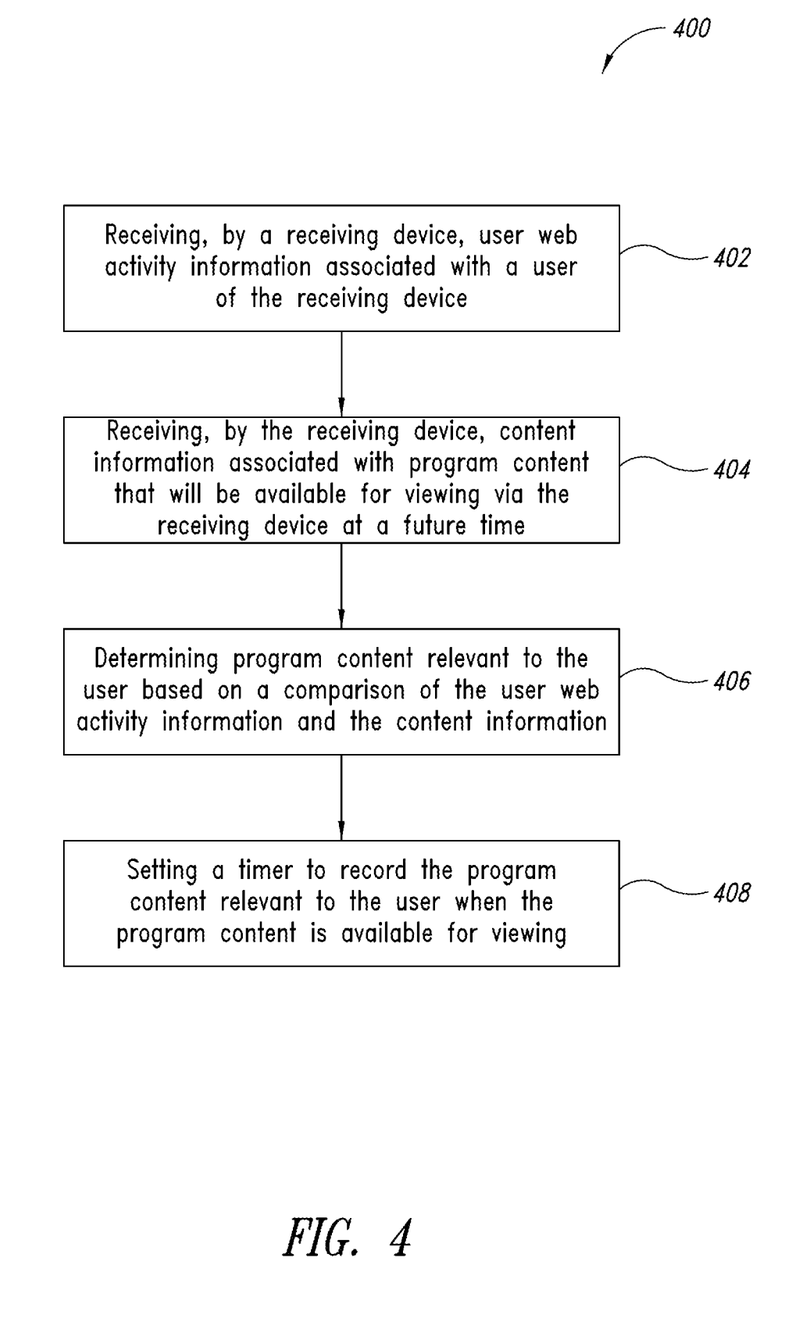
FIG. 4 is a flow chart illustrating a method for recording relevant program content based on a user's web activity, in accordance with one or more embodiments.

FIG. 4 is a flow chart illustrating a method 400 for recording relevant program content based on a user's web activity. At block 402, the method 400 includes receiving, by a receiving device 32, user web activity information associated with a user of the receiving device 32. The user's web activity information may be stored, for example, in the user web activity databases 45 (e.g., user web search database 44 and/or user social media database 46).

At block 404, the method 400 includes receiving, by the receiving device 32, content information associated with program content that will be available for viewing via the receiving device 32 at a future time. The program content that will be available for viewing at a future time may include any type of program content, including, for example, television shows, movies, premium content, pay-per-view content or the like. The content information may include any information describing or otherwise related to program content and may include, for example, program type, program description, program title, channel, start time, length, information associated with actors and actresses in a program, location or geographical information or the like. The receiving device 32 may receive the content information, for example, by accessing the content information database 42.

At block 406, the method 400 includes determining program content relevant to the user based on a comparison of the user web activity information and the content information. The receiving device 32 may determine the program content relevant to the user, for example, by comparing the content information received from the content information database 42 and the user web activity information received from the user web activity databases 45.

At block 408, the method 400 includes setting a timer to record the program content relevant to the user when the program content is available for viewing. Accordingly, the user may access the automatically recorded, relevant program content from a menu provided by the receiving device 32, and thus may view the relevant content at some later time.

The various embodiments described above can be combined to provide further embodiments. For example, in one or more embodiments, the content relevant to the user may be determined by logic residing on one or more servers located remote from the receiving device, with the receiving device receiving one or more signals instructing the receiving to automatically set one or more timers to record the content for later viewing. For example, the user web search or other web activity information may be collected by a third party (e.g., a search engine provider, video content provider, or any other such entity having access to user web activity information) and the third party may determine, based on the collected web search or web activity information (as well as the program content information stored in the content information database), content relevant to the user. The third party may thus instruct the receiving device (e.g., a set top box at the user's home or similar premises) to automatically set one or more timers to record the relevant content.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims can be given.

The invention claimed is:

1. A method, comprising:
   collecting, by a user computer device, user web activity information associated with a user, the user web activity information including at least one of: web search information associated with web searches performed using the user computer device, and social media information associated with the user;

receiving, by a set top box, the user web activity information from the user computer device;

accessing user profile information associated with the user stored in a user profile information database, the user profile information indicating an allotment of timers among a total number of timers available for recording content that are assigned to the user, the user profile information including user-provided timer priority information indicating an order of priority for manually set timers and automatically set timers, the timer priority information further indicating an order of priority between timers assigned to different users associated with the set top box;

receiving, by the set top box, program content and content information from a content providing system, the content information being associated with program content that will be available for viewing via the set top box at a future time;

comparing the received user web activity information and the received content information to determine program content relevant to the user;

determining, based on the allotment of timers assigned to the user and the timer priority information, whether a timer assigned to the user will be available for automatically recording the program content relevant to the user at the time the program content will be available for viewing;

in response to determining that a timer assigned to the user will be available for automatically recording the program content, automatically setting the timer in the set top box, in advance of the time when the program content relevant to the user will be available for viewing, to record the program content relevant to the user at the time the program content becomes available for viewing; and recording the program content relevant to the user at the time the program content becomes available for viewing.

2. The method of claim 1, further comprising:
storing the received user web activity information in one or more user web activity information databases; and
storing the received content information in a content information database.

3. The method of claim 2, wherein storing the received user web activity information in one or more user web activity information databases includes storing the received user web activity information in at least one of a user web search database and a user social media database.

4. The method of claim 3, wherein at least one of the user web search database and the user social media database is stored in the set top box.

5. The method of claim 3, wherein at least one of the user web search database and the user social media database is stored on a server remote from the set top box.

6. The method of claim 1, further comprising:
transmitting a message to the user computer device indicating that the timer has been automatically set to record the program content relevant to the user; and
receiving a message from the user, via the user computer device, instructing the set top box to record the program content relevant to the user at the time the program content becomes available for viewing.

7. The method of claim 1, further comprising:
accessing program content access restriction information associated with the user, wherein automatically setting the timer includes automatically setting the timer to record the program content relevant to the user if the program content is not restricted for recording by the user.

8. The method of claim 1, further comprising:
receiving user-provided information indicating a period of time for storing the recorded program content; and
automatically deleting the stored recorded program content after the recorded program content has been stored for the period of time.

9. A system for recording program content relevant to a user, comprising:
a receiving device having a processor and a computer-readable storage medium;
one or more web activity information databases storing web activity information associated with the user, the web activity information including at least one of: web search information associated with web searches performed using the user computer device, and social media information associated with the user;
a user profile information database storing user profile information associated with the user, the user profile information indicating an allotment of timers among a total number of timers available for recording content that are assigned to the user, the user profile information including timer priority information indicating an order of priority for manually set timers and automatically set timers; and
a content information database storing content information associated with program content that will be available for viewing via the receiving device at a future time,
the receiving device being configured to:
determine the program content relevant to the user based on a comparison of the user web activity information and the content information;
determine, based on the allotment of timers assigned to the user and the timer priority information, whether a timer assigned to the user will be available for automatically recording the program content relevant to the user at the time the program content will be available for viewing; and
in response to determining that a timer assigned to the user will be available for automatically recording the program content, automatically set the timer, in advance of the time when the program content relevant to the user will be available for viewing, to record the program content relevant to the user at the time the program content relevant to the user becomes available for viewing.

10. The system of claim 9, the one or more user web activity information databases including at least one of a user web search database and a user social media database.

11. The system of claim 10, wherein at least one of the user web search database and the user social media database is stored in the receiving device.

12. The system of claim 10, wherein at least one of the user web search database and the user social media database is stored on a server remote from the receiving device.

13. The system of claim 9, the receiving device being further configured to:
transmit a message to a user computer device indicating that the timer has been automatically set to record the program content relevant to the user; and
receive a message from the user, via the user computer device, instructing the receiving device to record the program content relevant to the user at the time the program content becomes available for viewing.

14. The system of claim 9, wherein the user profile information includes program content access restriction information associated with the user.

15. The system of claim 9, wherein the receiving device includes an Internet television application.

16. The system of claim 9 wherein the timer priority information stored in user profile information database includes user-provided timer priority information that indicates an order of priority between timers assigned to different users associated with the receiving device.

17. The system of claim 9, the receiving device being further configured to:
  receive user-provided information indicating a period of time for storing the automatically recorded program content; and
  automatically delete the recorded program content after the recorded program content has been stored for the period of time.

18. A non-transitory computer-readable storage medium storing instructions which, when executed by a processor, cause the processor to:
  receive user web activity information associated with a user of a receiving device, the user web activity information including at least one of: web search information associated with web searches performed using the user computer device, and social media information associated with the user;
  receive user profile information associated with the user stored in a user profile information database, the user profile information indicating an allotment of timers among a total number of timers available for recording content that are assigned to the user, the user profile information including timer priority information indicating an order of priority for manually set timers and automatically set timers;
  receive content information associated with program content that will be available for viewing via the receiving device at a future time;
  compare the received user web activity information and the received content information to determine program content relevant to the user;
  determine, based on the allotment of timers assigned to the user and the timer priority information, whether a timer assigned to the user will be available for automatically recording the program content relevant to the user at the time the program content will be available for viewing; and
  in response to determining that a timer assigned to the user will be available for automatically recording the program content, provide an instruction to automatically set the timer, in advance of the time when the program content relevant to the user will be available for viewing, to record the program content relevant to the user at the time the program content becomes available for viewing.

19. The non-transitory computer-readable storage medium of claim 18, wherein the processor is located remote from the receiving device.

20. The non-transitory computer-readable storage medium of claim 18 wherein the timer priority information includes user-provided timer priority information that indicates an order of priority between timers assigned to different users associated with the receiving device, the instructions which, when executed by a processor, further cause the processor to:
  determine whether the timer assigned to the user will be available for automatically recording the program content relevant to the user, based further on the user-provided timer priority information.

* * * * *